3,117,430
SPLINE COUPLING
Erich O. Mueller, Irwin, Pa., assignor to Westinghouse Electric Corporation, East Pittsburgh, Pa., a corporation of Pennsylvania
Filed Aug. 23, 1962, Ser. No. 219,066
4 Claims. (Cl. 64—9)

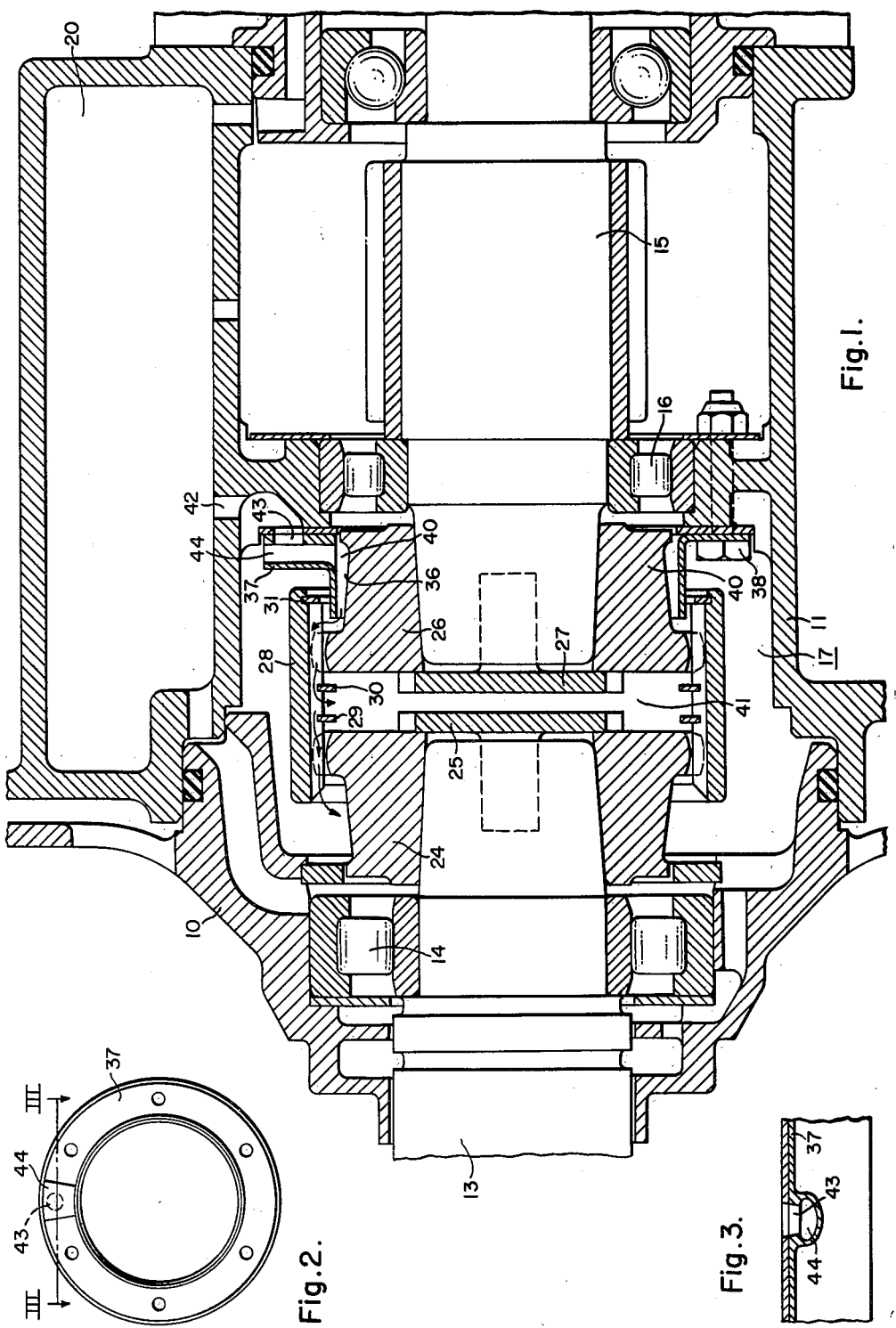

The present invention relates to spline couplings, and more particularly to a spline coupling and lubrication arrangement therefor.

Spline couplings are conventionally used to connect driving and driven shafts where limited axial movement between the shafts is desired to be permitted. In order that such couplings will operate smoothly and quietly with long wearing qualities, they should be thoroughly and continuously lubricated during use. In some applications where the spline coupling may be totally enclosed, such as in the casing of a combined rigidly connected traction motor and gear case, difficulties have been encountered in devising arrangement for continuously lubricating the spline coupling that may be used between the motor shaft and pinion gear shaft.

It is a principal object of the present invention to provide a spline coupling having an improved arrangement for continuously lubricating the spline teeth during use.

Another object of the present invention is to provide a spline coupling having an improved arrangement for lubricating the same while the spline coupling is in use and totally enclosed within an associated casing structure.

In accordance wtih the invention, the spline coupling is comprised of a driving spline gear, a driven spline gear and an internally splined sleeve coupling interconnecting the driving and driven spline gears. One of the spline gears is provided with an extended hub portion to extend from beneath the splined sleeve in the assembled relation. A stationary lubricant collar is provided to surround but be spaced from the extended hub portion of the spline and it extends under the splined sleeve member. Provision is made for the continuous introduction of lubricant through the lubricant collar in the space between the lubricant collar and the extended hub of the spline gear. In such manner a continuous flow of lubricant is caused to pass through the splines of the sleeve and the driving and driven spline gears during the operation of the spline coupling. It should be apparent that, in view of the lubricant collar arrangement for continuously introducing lubricant into the spline teeth of the coupling, the coupling may be totally enclosed within the surrounding machine structures and may therefore be relatively inaccessible for periodic lubricant servicing as would be required with a conventional spline coupling arrangement not providing the lubricant arrangement of the invention.

Further objects, features and attending advantages of the invention will be apparent with reference to the following specification and drawing, in which:

FIGURE 1 is a fragmentary section of a machine structure embodying the spline coupling and lubricant arrangement of the invention;

FIG. 2 is a detailed front elevational view of the lubricant collar associated with the spline coupling of the invention; and FIG. 3 is a detailed fragmentary section on the line III—III of FIG. 2.

Referring to the drawing the spline coupling of the invention will be described as it may be used to interconnect the motor shaft and pinion shaft of a combined traction motor and gear case mechanical structure. It should be understood, however, that the coupling arrangement of the invention is not limited to use with electric traction drive arrangements but may be used in any mechanical arrangement in which the spline coupling is intended to be enclosed, or otherwise inaccessible for normal lubrication techniques.

In the drawings, an end portion of the electric traction motor is shown at 10 and a portion of the gear casing that is rigidly connected to the traction motor is shown at 11. The electric motor drive shaft 13 is journalled in a bearing 14 in the electric motor casing 10. The pinion drive shaft 15 is journalled in a bearing 16 within the gear case 11. The shafts 13 and 15 are generally coaxial and the spline coupling of the invention is closed within the space 17 formed by the adjoining walls of the electric motor case 10 and gear casing 11.

It should be understood that the gear casing 11 is a completely enclosed structure in which a lubricant such as lubricating oil is continuously circulated through various passageways to lubricate the gearing and bearings therein. Various arrangements for circulating the oil may be provided, such as oil circulating pumps, or a splash lubrication system may be used to assure a steady supply of lubricant to the chamber 20 which is shown to be positioned above the axes of the driving shaft 13 and the driven shaft 15. In order to simplify the drawings the various oil passageways for continuously circulating oil to and from the oil sump (not shown) are not specifically illustrated and will not be specifically described.

The spline coupling of the invention is comprised of a driving spline gear 24 which is secured to the traction motor shaft 13 by means of the fastening member 25, and a driven spline gear 26 similarly secured to the pinion gear shaft 15 by the fastening element 27. Bridging the space between the driving and driven spline gears 24 and 26 is an internally splined coupling sleeve member 28 which is secured in assembled relation for limited sliding movement by means of the retaining snap rings 29, 30 and 31. In such manner the coupling sleeve 28 is semi-permanently assembled to couple the driving and driven spline gears 24 and 26 at the time the gear casing 11 is bolted to the electric motor casing 10.

It will be noted that one of the spline gears, namely the driven spline gear 26, is provided with an extended hub portion 36 that extends outwardly from beneath the internal splines of the sleeve coupling member 28 as shown. In accordance with the invention, the lubricant collar 37, which may be stationary and fastened by bolts such as the bolt 38 to the gear casing 11, is formed to surround the extended hub portion 36 of the driven spline gear 26 and to extend beneath the spline surfaces of the sleeve 28. However, the lubricant collar 37 is of such dimension as to be spaced from the hub portion 36 of the spline gear 26 and thus provide the annular space 40 in which a flow of lubricant may be contained. Assuming a steady flow of lubricant into the annular space 40 between the lubricant collar 37 and the hub 36 of the spline gear 26, the lubricant will be constrained to follow the path of the arrows through the spline teeth of the spline coupling sleeve 28 and the spline gears 24 and 26. In such manner a steady flow of lubricant will also be present in the space 41 between the driving and driven spline gears 24 and 26 respectively and through the spline teeth of the driving gear 24 into the space 17. Suitable drain passages (not shown) may be provided to drain lubricant from the space 17 into the lubricant sump of the gear casing.

A preferred arrangement for introducing lubricant into the lubricant collar 37 and the space 40 between the lubricant collar and the extended hub portion 36 of the spline gear 26 is the provision of the passageways 42 and 43 to the passageway 44 in the lubricant collar 37. Thus, the lubricant contained within the chamber 20 is constrained to flow by gravity or other force into the lubricant collar and the annular space 40 between the lubricant collar and the extended hub portion of the spline gear 26.

It should now be apparent to those skilled in the art that a novel form of spline gear coupling and lubrication arrangement therefor has been described that will assure a steady flow of lubricant through the spline coupling continuously during its use so that the coupling may be totally enclosed in the machinery and will not require periodic lubrication servicing.

Various modifications may be made within the spirit of the invention and the scope of the appended claims. For example, although the lubricant collar 37 has been shown to be stationary in the preferred arrangement, it should be obvious that the lubricant collar need not be stationary but may be affixed to a rotating part of the machinery if desired. Also, although the lubricant flow is provided by splash and gravity arrangements as described, obviously the lubricant flow may be a pressure flow as provided by a lubricant pump or the like. Furthermore, the lubricant collar 37 may be arranged to surround an extended hub portion of the spline gear 24 instead of the spline gear 26 or lubricant collars may be associated with both spline gears 24 and 26.

I claim as my invention:

1. A spline coupling comprising a driving spline gear, a driven spline gear, one of said gears having an extended hub portion, a spline sleeve surrounding and interconnecting the splines of said driving and driven gears with a portion of said hub extending from beneath the sleeve, a lubricant collar surrounding and spaced from said hub and extending beneath the spline surfaces of said sleeve, and means to introduce lubricant into the space between said collar and gear hub.

2. A spline coupling comprising, a driving spline gear, a driven spline gear, one of said gears having an extended hub portion, a spline sleeve surrounding and interconnecting the splines of said driving and driven gears with a portion of said hub extending from beneath the sleeve, a stationary lubricant collar surrounding and spaced from said hub and extending beneath the spline surfaces of said sleeve, and means to introduce lubricant into the space between said collar and gear hub.

3. A spline coupling comprising, a driving spline gear, a driven spline gear, one of said gears having an extended hub portion, a spline sleeve surrounding and interconnecting the splines of said driving and driven gears with a portion of said hub extending from beneath the sleeve, a stationary lubricant collar surrounding and spaced from said hub and extending beneath the spline surfaces of said sleeve, a source of lubricant positioned above the axis of said driving and driven gears, and means to introduce lubricant from said source into the space between said collar and gear hub.

4. A spline coupling comprising, a driving spline gear, a driven spline gear, one of said gears having an extended hub portion, a spline sleeve surrounding and interconnecting the splines of said driving and driven gears with a portion of said hub extending from beneath the sleeve, a stationary lubricant collar surrounding and spaced from said hub and extending beneath the spline surfaces of said sleeve, a source of lubricant positioned above the axis of said driving and driven gears, and means to introduce lubricant by gravity flow from said source into the space between said collar and gear hub.

References Cited in the file of this patent

UNITED STATES PATENTS

| | | |
|---|---|---|
| 1,770,743 | Morgan | July 15, 1930 |
| 2,726,523 | Zrodowski | Dec. 13, 1955 |

FOREIGN PATENTS

| | | |
|---|---|---|
| 667,217 | Great Britain | Feb. 27, 1952 |